United States Patent
Aizawa et al.

(10) Patent No.: US 8,431,679 B2
(45) Date of Patent: Apr. 30, 2013

(54) POLYPHENYLENE SULFIDE RESIN COATED ARTICLE

(75) Inventors: Shifumi Aizawa, Chiba (JP); Taku Shimaya, Chiba (JP); Keizo Okabe, Tokyo (JP); Tomohiro Nagano, Tokyo (JP)

(73) Assignees: DIC Corporation, Tokyo (JP); Origin Electric Company, Limited, Tokyo (JP)

( * ) Notice: Subject to any disclaimer, the term of this patent is extended or adjusted under 35 U.S.C. 154(b) by 822 days.

(21) Appl. No.: 11/994,042

(22) PCT Filed: Jun. 28, 2006

(86) PCT No.: PCT/JP2006/312928
§ 371 (c)(1), (2), (4) Date: Jan. 23, 2008

(87) PCT Pub. No.: WO2007/001036
PCT Pub. Date: Jan. 4, 2007

(65) Prior Publication Data
US 2009/0118405 A1  May 7, 2009

(30) Foreign Application Priority Data

Jun. 28, 2005 (JP) .............................. P2005-188229

(51) Int. Cl.
*C08G 75/00* (2006.01)
(52) U.S. Cl.
USPC ............................. 528/373; 525/189; 524/502
(58) Field of Classification Search .................. 525/189; 528/373; 524/502
See application file for complete search history.

(56) References Cited

U.S. PATENT DOCUMENTS

| 5,234,984 A | | 8/1993 | Kohler et al. | |
| 5,840,783 A | * | 11/1998 | Momchilovich et al. | 522/112 |
| 2002/0161089 A1 | * | 10/2002 | Nagatoshi et al. | 524/394 |
| 2004/0138377 A1 | | 7/2004 | Matsuoka | |

FOREIGN PATENT DOCUMENTS

| DE | 3728301 | | 3/1989 |
| EP | 304785 | | 3/1989 |
| EP | 389905 | * | 10/1990 |
| JP | 50-146626 | | 11/1975 |
| JP | 58-074751 | | 5/1983 |
| JP | 59-145131 | | 8/1984 |
| JP | 59-207921 | | 11/1984 |
| JP | 62-127328 | | 6/1987 |
| JP | 62-289280 | | 12/1987 |
| JP | 64-69658 | | 3/1989 |
| JP | 3-287633 | | 12/1991 |
| JP | 4-159369 | | 6/1992 |
| JP | 2000226536 | | 8/2000 |
| JP | 2002097292 | | 4/2002 |
| WO | 2004/108828 A1 | | 12/2004 |
| WO | 2007/001036 | | 1/2007 |

OTHER PUBLICATIONS

European Patent Application No. 06767545.4: Extended European Search Report, dated Sep. 23, 2011.

* cited by examiner

*Primary Examiner* — Shane Fang
(74) *Attorney, Agent, or Firm* — McDermott Will & Emery LLP

(57) ABSTRACT

A polyphenylene sulfide resin coated article comprising: a molded article (A) of a polyphenylene sulfide resin material (a) which comprises a polyphenylene sulfide resin (a1), and a coated film layer (B) which is formed by applying a coating which comprises as a solid component a chlorinated polyolefin resin (b1) having a chlorine atom content of 20 to 45% by mass on the surface of the molded article (A).

14 Claims, No Drawings

POLYPHENYLENE SULFIDE RESIN COATED ARTICLE

CROSS-REFERENCE TO PRIOR APPLICATION

This is a U.S. National Phase Application under 35 U.S.C. §371 of International Patent Application No. PCT/JP2006/312928 filed Jun. 28, 2006 which claims the benefit of Japanese Patent Application No. 2005-188229 filed Jun. 28, 2005, both of which are incorporated by reference herein. The International Application was published in Japanese on Apr. 1, 2007 as WO 2007/001036 A1 under PCT Article 21(2).

TECHNICAL FIELD

The present invention relates to a polyphenylene sulfide resin coated article having a polyphenylene sulfide resin molded article and a coated film strongly adhered to the surface of the resin molded article.

BACKGROUND ART

Resin materials such as acrylonitrile-butadiene-styrene copolymer (ABS) or polycarbonate, which can achieve superior surface appearance and low warping of a molded article, and metal materials such as magnesium alloys, which have the lowest specific gravity among practical metals while also having high strength, are widely used as materials for the cases of portable electric and electronic devices typically represented by cellular telephones, PDAs and notebook PCs. In recent years, the materials used for the cases of the portable electric and electronic devices are required to have high specific strength. For example, in a case of cellular telephones, materials used for the cases of cellular telephones are required to have high specific strength since cellular telephones have come to be required to be provided with smaller cases and larger liquid crystal displays.

However, cases composed of conventionally used materials such as ABS or polycarbonate lack adequate strength of the material itself, requiring that the lack of strength be compensated for by increasing the thickness of the case. Thus, the thickness of device cases is currently moving in the opposite direction from current demands. In addition, although magnesium alloys have superior strength, the superior electromagnetic shielding property of the magnesium alloys ends up conversely being a disadvantage since these alloys cannot be applied to devices containing a built-in antenna due to the excellent electromagnetic shielding property of the alloys. In addition, magnesium alloys have a higher specific gravity than plastic materials, while also having the problem of higher costs.

In contrast, since polyphenylene sulfide resin (abbreviated as "PPS resin") has properties that are favorable for use as an engineering plastic such as superior heat resistance, rigidity, dimensional stability and flame resistance, it is widely used primarily for injection molding in various electric and electronic parts, mechanical parts, automotive parts and the like. Therefore, the applications of BPS resin have increased in recent years, and their application is also being examined for functional parts like those exposed to the outside such as the case materials of portable electric and electronic devices as described above. However, the adhesion of DPS resin to other materials is inferior. Therefore, when the PPS resin is applied to functional parts like those exposed on the outside such as the case materials of portable electric and electronic devices and the surface thereof is modified by any of ordinary secondary processing such as coating or vapor deposition, the coated film of PPS resin separates easily due to the poor adhesion between the PPS resin and other materials, and adequate surface secondary processability is not achieved even if the PPS resin surface is coated with a primer.

Therefore, as an example of a technology for carrying out secondary processing on the surface of BPS resin molded articles, a technology is proposed wherein the surface of a PPS resin molded article is made rough by sandblasting or shotblasting and the like followed by coating with a primer (seer for example, Patent Document 1).

However, in methods involving sandblasting or shotblasting the surface of a BPS resin molded article followed by coating with a primer as described above, it is necessary to include a step for roughening the surface of the PPS resin molded article, and device production time and costs increase. Accordingly, this method has extremely disadvantage in industrial production.

On the other hand, regarding a technology for coating chlorinated polyolefin onto the surface of a PPS resin molded articles Patent Document 2 indicated below describes that chlorinated polyolefin can be coated onto the surface of a PPS pipe. However, typical commercially available chlorinated polyolefins have a chlorine atom content of about 70% by mass, and adhesion of chlorinated polyolefin with the base material which is a PPS resin molded article is insufficient when a base material having such a high chlorine atom content is used.

[Patent Document 1] Japanese Unexamined Patent Application, First Publication No. 2002-97292

[Patent Document 2] Japanese Unexamined Patent Application, First Publication No. S59-145131 (lines 1 to 2 of the lower right column on page 2)

DISCLOSURE OF THE INVENTION

Therefore, an object of the present invention is to provide a PPS resin coated article in which a strong coated film is formed on the surface of a PPS resin molded article, and in the case of using the coated film as a primer, enables preferably various types of secondary surface processing such as coating or vapor deposition to be carried out on the surface thereof.

As a result of conducting extensive studies to solve the aforementioned problems, the inventors of the present invention found that a resin material (b) containing a chlorinated polyolefin resin (b1) having a prescribed chlorine atom content favorably adheres to the surface of a layer (A) comprised of a molded article of a PPS resin (a) regardless of the composition of the layer (A) and without carrying out special surface post-treatment such as surface roughening, thereby leading to completion of the present invention.

Namely, the present invention relates to a polyphenylene sulfide resin coated article comprising: a molded article (A) of a polyphenylene sulfide resin material (a) which comprises a polyphenylene sulfide resin (a1), and a coated film layer (B) formed by applying a coating which comprises as a solid component a chlorinated polyolefin resin (b1) having a chlorine atom content of 20 to 45% by mass on the surface of the molded article (A).

According to the present invention, a structure can be provided in which a strong coated film is formed on the surface of a PPS resin molded article, and in the case of using the coated film as a primer, enables various types of secondary surface processing such as coating or vapor deposition to be preferably carried out on the surface thereof. Accordingly, the structure can be used as a material of composite parts of portable electric and electronic devices or automotive exterior parts.

BEST MODE FOR CARRYING OUT THE INVENTION

The following provides a detailed explanation of the present invention.

The polyphenylene sulfide resin (a1) comprised in the polyphenylene sulfide resin material (a) used in the present invention has a resin structure which includes repeating units in the form of a structure in which an aromatic ring is bonded to a sulfur atom. More specifically, the polyphenylene sulfide resin (a1) is a resin comprised of repeating units represented by the following structural formula (1).

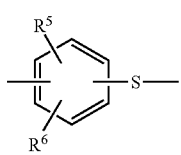
(1)

(wherein, $R^5$ and $R^6$ each independently represent a hydrogen atom, alkyl group having 1 to 4 carbon atoms, nitro group, amino group, phenyl group, methoxy or ethoxy).

Here, in the structural unit represented by structural formula (1) above, $R^5$ and $R^6$ in the formula are particularly preferably hydrogen atoms from the viewpoint of the mechanical strength of the polyphenylene sulfide resin (a1). Examples of the unit include those bonded at the para position as represented by the following structural formula (2) and those bonded at the meta position as represented by the following structural formula (3).

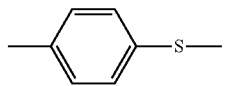
(2)

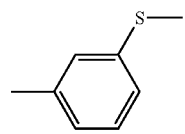
(3)

Among these, a structure in which bonding of the sulfur atom to the aromatic ring in the repeating unit is such that the sulfur atom is bonded to the para position of the aromatic ring as represented by structural formula (2) above is preferable in terms of the heat resistance and crystallinity of the polyphenylene sulfide resin (a1).

In addition, the polyphenylene sulfide resin (a1) may, in addition to the structural part represented by structural formula (1) above, contain 30 mol % or less of at least one structural part selected from the following structural formulas (4) to (7), based on the total number of moles of the structural parts represented by the structural formulas (1) and (4) to (7).

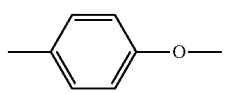
(4)

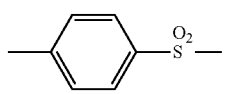
(5)

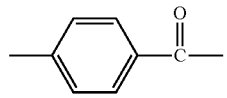
(6)

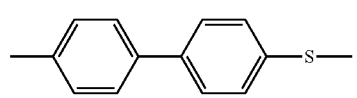
(7)

In particular in the present invention, it is preferable that the content of a structural part represented by the structural formulas (4) to (7) is 10 mol % or less from the viewpoint of favorable heat resistance and mechanical strength of a molded article comprised of the polyphenylene sulfide resin (a1).

In addition, in the case a structural part represented by the structural formulas (4) to (7) is contained in the polyphenylene sulfide resin (a1), the bonding type thereof may be a random copolymer or block copolymer.

In addition, the polyphenylene sulfide resin (a1) may have, in the molecular structure thereof, a trifunctional structural part represented by the following structural formula (8), a napthyl sulfide bond and the like. It is preferable that the structural part, bond or the like exists in the resin in an amount of 3 mol % or less, and particularly preferably 1 mol % or less, based on the total number of moles of these structural part and the other structural parts.

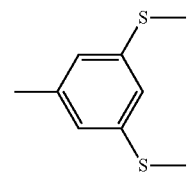
(8)

The polyphenylene sulfide resin (a1) can be produced according to, for example, the methods described in (1) to (4) below:

(1) a method in which sodium sulfide and p-dichlorobenzene are allowed to react in an amide-based solvent such as N-methylpyrrolidone or dimethylacetoamide or a sulfone-based solvent such as sulfolane;
(2) a method in which p-dichlorobenzene is polymerized in the presence of sulfur and sodium carbonate,
(3) a method in which sodium sulfide r a mixture of sodium hydrosulfide and sodium hydroxide, or a mixture of hydrogen sulfide and sodium hydroxide, is dropped into A mixed solvent of a polar solvent and p-dichlorobenzene followed by polymerization; and
(4) a method employing self-condensation of p-chlorothiophenol.

Among these, the method described in (1) wherein sodium sulfide and p-dichlorobenzene are reacted in an amide-based solvent such as N-methylpyrrolidone or dimethylacetoamide or sulfone-based solvent such as sulfolane is preferable in that it allows the reaction to be controlled easily and is superior for industrial production. In addition, in the method of (1), an alkaline metal salt of a carboxylic acid, an alkaline metal salt of a sulfonic acid or an alkaline hydroxide is preferably added to adjust the degree of polymerization.

In addition, the melt flow rate of the polyphenylene sulfide resin (a1) is within the range of 1 to 3000 g/10 minutes, preferably within the range of 5 to 2300 g/10 minutes, and even more preferably within the range of 10 to 1500 g/10 minutes from the viewpoint of moldability and surface strength. The melt flow rate is the value determined by measuring under a load of 5000 g at 316° C. in accordance with ASTM D1238-86 (orifice: 0.825±0.002 inches in diameter× 0.315±0.0001 inches in length).

It is preferable that, after the polyphenylene sulfide resin (a1) is produced as described above, the resin (a1) is further treated with acid and subsequently washed with water, from the viewpoint of being able to reduce residual amounts of low molecular weight impurities formed as a by-product during polymerization as well as improving moisture resistance properties by reducing the amount of residual metal ions.

Preferable examples of the acid usable in the aforementioned acid treatment include acetic acid, hydrochloric acid, sulfuric acid, phosphoric acid, silicic acid, carbonic acid and propriolic acids. These acids are preferable from the viewpoint of being able to efficiently reduce the amount of residual metal ions without decomposing the polyphenylene sulfide resin (a1). Among them, acetic acid and hydrochloric acid are particularly preferable.

An example of a method for the acid treatment is immersing the PAS resin in an acid or an aqueous acid solution. Stirring or heating may be carried out at this time as necessary.

Here, when acetic acid is used for the aforementioned acid treatment, a specific example of the treatment include a method wherein an aqueous solution of acetic acid adjusted at pH 4 is heated to 80 to 90° C. and the polyphenylene sulfide resin (a1) is immersed therein, and then stirring is conducted for 20 to 40 minutes.

The polyphenylene sulfide resin (a1) subjected to acid treatment in this manner is then washed several times with water or hot water to physically remove residual acid or salt and the like. The water used at this time is preferably distilled water or deionized water.

Preferably, the polyphenylene sulfide resin (a1) before the aforementioned acid treatment is in the form of a powder. Practically, the polyphenylene sulfide resin (a1) may be in the form of granules such as pellets or a slurry after having been polymerized.

The heat resistance, mechanical properties, dimensional stability, crystallization rate and electrical properties of the polyphenylene sulfide resin coated article can be further improved by containing a fibrous inorganic filler (a2) in addition to the polyphenylene sulfide resin (a1) in the polyphenylene sulfide resin material (a).

Examples of fibrous inorganic fillers used here include processed inorganic fibers, as glass fibers, carbon fibers, zinc oxide whiskers, asbestos fibers, silica fibers, aluminum borate whiskers, silica-alumina fibers, zirconia fibers, boron nitride fibers or potassium titanate fibers, and metal fibers such as stainless steel, aluminum, titanium, copper or brass fibers. Among these, glass fibers are particularly preferable in applications which require electrical insulating performance.

In addition, these fibrous inorganic fillers may be used alone or two or more types may be used in combination.

When the fibrous inorganic filler (a2) is used in combination with a surface treatment agent or coupling agent as necessary, it is possible to improve adhesion between PPS resin (a1), an elastomer (a4), an ester wax (a5) and other additives which are subsequently described. That is, it is possible to improve the aforementioned various properties more effectively.

Here, examples of surface treatment agents or coupling agents include silane coupling agents having a functional group such as an amino group, epoxy group, isocyanate group, vinyl group or the like, titanate compounds, various types of urethane resins and epoxy resins.

In addition, the heat resistance, mechanical properties, dimensional stability, crystallization rate and electrical properties of the polyphenylene sulfide resin coated article can be further improved by containing a non-fibrous inorganic filler (a3) in addition to the polyphenylene sulfide resin (a1) in the polyphenylene sulfide resin material (a).

Examples of non-fibrous inorganic fillers usable for the polyphenylene sulfide resin material (a) include calcium carbonate, magnesium carbonate, talc, zinc oxide, hydrotalcite, zeolite, glass beads, glass powder, glass balloons, aluminum silicate, calcium silicate, silicon carbide, boron, nitride, various metal powders, barium sulfate, calcium sulfate, kaolin, clay, pyroferrite, bentonite, sericite, mica, nephelinite, attapulgite, wollastonite, ferrite, dolomite, antimony trioxide, titanium oxide, alumina, magnesium oxide, magnesium hydroxide, iron oxide, molybdenum disulfide, graphite, gypsum, quartz, silica and quartz glass.

In addition, this non-fibrous inorganic filler (a3) is able to improve adhesion between polyphenylene sulfide resin (a1), elastomer (a4), ester wax (a5) and other additives by combining with a surface treatment agent or coupling agent in the same manner as the fibrous inorganic filler (a2), thereby raking it possible to improve the aforementioned various properties more effectively.

Although there are no particular limitations on the blending ratio of the fibrous inorganic filler (a2) or non-fibrous inorganic filler (a3), it is within a range that does not impair the effects of the present invention, and it is preferably 5 to 70 parts by mass based on 100 parts by mass of the PPS resin material (a).

Furthermore, it is also possible to use filler other than the fibrous inorganic filler (a2), and high boiling point organic fibrous substances such as aramid fibers, polyamide, fluororesin or acrylic resin can also be used as filler in the present invention.

An elastomer (a4) is preferably added to the polyphenylene sulfide resin material (a) used in the present invention for the purpose of imparting flexibility and improving low-temperature impact resistance. It is preferable that elastomer (a4) can be melted, mixed and dispersed at the temperature which is used when polyphenylene sulfide resin (a1) is kneaded. Namely the elastomer (a4) preferably has a melting point of 300° C. or lower and also has rubber elasticity at room temperature. Examples thereof include various types of polyolefin-based elastomers, olefin copolymer-based elastomers, styrene-butadiene rubber (SBR), hydrogenated SBR, ethylene-propylene rubber (EPM), ethylene-propylene-diene-based rubber (EPDM), butadiene rubber, chloroprene rubber, nitrile rubber, butyl rubber, acrylic rubber, silicon rubber, fluoro rubber, urethane rubber and various types of thermoplastic elastomers. Among these, olefin copolymer-based elastomers are preferable and ethylene copolymer-based elastomers are more preferable from the viewpoint of demonstrating remarkable impact resistance improving effects.

In addition, these elastomers may be used alone, or two or more types may be used in combination.

Here, the monomer component of the ethylene copolymer-based elastomer is preferably a di-copolymer of ethylene and maleic anhydride or ethylene and an α,β-unsaturated carboxylic acid glycidyl ester, or a tri-copolymer in which an α,β-unsaturated carboxylic acid alkyl ester has been added to the two components usable for the di-copolymer. Among these, the aforementioned tri-copolymer is particularly preferable from the viewpoint of superior bending elasticity and elongation. In addition, among the aforementioned tri-copolymers, copolymers of ethylene, α,β-unsaturated carboxylic acid alkyl ester and α,β-unsaturated carboxylic acid glycidyl ester are preferable from the viewpoint of being able to dramatically improve compatibility.

There are no particular limitations on the ratio of each monomer component in the tri-copolymers, and a preferable range thereof can be selected according to the monomer composition required. For example, from the viewpoint of balanced performance among impact strength, elongation and compatibility, a mass ratio range of 50 to 98/1 to 30/1 to 30 is preferable in the case of a tri-copolymer consisting of ethylene/$\alpha,\beta$-unsaturated carboxylic acid alkyl ester/maleic anhydride, and a mass ratio range of 50 to 98/1 to 49/1 to 10 is preferable in the case of a tri-copolymer consisting of ethylene/$\alpha,\beta$-unsaturated carboxylic acid alkyl ester/$\alpha,\beta$-unsaturated carboxylic acid glycidyl ester.

Examples of $\alpha,\beta$-unsaturated carboxylic acid alkyl esters which can be used for forming the aforementioned di-copolymers or tri-copolymers include alkyl esters of unsaturated carboxylic acids having 3 to 8 carbon atoms such as acrylic acid or methacrylic acid. Specific examples thereof include methyl acrylate, ethyl acrylate, n-propyl acrylate, isopropyl acrylate, n-butyl acetylate, t-butyl acrylate, isobutyl acrylate, methyl methacrylate, ethyl methacrylate, n-propyl methacrylate, isopropyl methacrylate, n-butyl methacrylate, t-butyl methacrylate and isobutyl methacrylate. Among these, ethyl acrylate, n-butyl acrylate and methyl methacrylate are preferable from the viewpoint of superior impact resistance improving effects.

The mixing ratio of the polyphenylene sulfide resin (a1) component and the elastomer (a4) component in the polyphenylene sulfide resin material (a) of the present invention is preferably within the range of a mass ratio of (a1)/(a4) of 5/95 to 95/5. When the ratio of component (a1) to the total mass of component (a1) and component (a4) ((a1)+(a4)) is within the range of 5% by mass or more, various inherent properties of polyphenylene sulfide resin (a1) such as heat resistance, mechanical properties and chemical resistance are easily demonstrated. When the ratio of component (a4) is 5% by mass or more, improving effects on toughness and impact resistance of the resin material become prominent.

In the present inventions in the case of a composition in which polyphenylene sulfide resin material (a) does not contain elastomer (a4), an ester-based wax (a5) is preferably added to the polyphenylene sulfide resin material (a) as a processing assistant. The polyphenylene sulfide resin material (a) containing the ester-based wax (a4) is preferable in that it has favorable separation from a mold and favorable adhesion with the coated film layer (B).

The aforementioned ester-based wax (a5) is preferably a higher fatty acid ester of a polyvalent alcohol. In additions the amount of ester-based wax (a5) added is preferably within the range of 0.01 to 3.0 parts by mass based on 100 parts by mass of the polyphenylene sulfide resin material (a) from the viewpoint of mold releasability.

A polyvalent alcohol as referred to here indicates an alcohol having two or more hydroxyl groups in a molecule thereof, while a higher fatty acid is preferably a saturated or unsaturated fatty acid having 8 to 45 carbon atoms.

Specific examples of these higher fatty acid esters of polyvalent alcohols include esters of fatty acids such as caprylic acid, lauric acid, myristic acid, behenic acid, stearic acid, montanic acid, oleic acid or palmitic acid, and polyvalent alcohols such as ethylene glycol, glycerin, 2-methylpropane-1,2,3-triol and pentaerythritol, and branched polyester oligomers thereof.

The polyphenylene sulfide resin material (a) of the present invention can, for example, contain, within a range that does not impair the effects of the present invention, a homopolymer or copolymer of a monomer such as ethylene, butylene, pentene, butadiene, isoprene, chloroprene, styrene, $\alpha$-methylstyrene, vinyl acetate, vinyl chloride, acrylic ester, methacrylic ester or (meth)acrylonitrile, or a homopolymer, random copolymer, block copolymer or graft copolymer of a polyester such as polyurethane, polybutylene terephthalate or polyethylene terephthalate, polyacetal, polycarbonate, polyamide, polysulfone, polyallyl sulfone, polyether sulfone, polyarylate, polyphenylene oxide, polyether ketone, polyether ether ketone, polyimide, polyamideimide, polyether imide, silicone resin, phenoxy resin, fluororesin, liquid crystal polymer or polyallyl ether.

In addition, the polyphenylene sulfide resin material (a) can also be suitably incorporated with an additive such as a lubricant or stabilizer within a range that does not impair the effects of the present invention in addition to each of the components described above.

There are no particular limitations on the method used to prepare the polyphenylene sulfide resin material (a) used in the present invention, and can be prepared with conventionally known production apparatuses and methods. For example, the polyphenylene sulfide resin material (a) can be obtained by mixing the polyphenylene sulfide resin (a1), the fibrous inorganic filler (a2), the non-fibrous inorganic filler (a3), the elastomer (a4) and various types of additives incorporated as necessary with a Henschel mixer or tumbler and the like in advance, followed by supplying the mixture to a single-screw or twin-screw extruding machine and the like to knead at 250 to 350° C. and subsequently granulating the mixture to form pellets.

In order to produce a molded article (A) from the polyphenylene sulfide resin material (a) described in detail thus far, a target molded article (A) is obtained by, for example, injection molding, extrusion molding or compression molding of the polyphenylene sulfide resin material (a).

Examples of specific applications of the molded article (A) include composite parts including cases of portable electric and electronic devices such as cellular telephones and notebook PCs, automotive exterior parts such as side mudguards, bumpers, wheel caps, moldings and various types of sensors, and electronic parts such as connectors, switches, sensors, resistors, relays, capacitors, sockets, jacks, fuse holders, coil bobbins and IC and LED housings. Among these, the present invention is particularly useful as a case of a portable electric or electronic device or an automotive exterior part.

The polyphenylene sulfide resin coated article of the present invention also comprises a coated film layer (B), which is formed by applying a coating containing as solid a chlorinated polyolefin resin (b1) having a chlorine atom content of 20 to 45% by mass on the surface of the aforementioned molded article (A) of the polyphenylene sulfide resin material (a). As previously described, normally the surface of a polyphenylene sulfide resin molded article has inferior adhesion, making it difficult to easily form a coated film even if the film is a primer used for secondary surface processing. In contrast, in the present invention, the use of the chlorinated polyolefin resin (b1) as a solid component of the coating wherein the resin (b1) has a chlorine atom content within the range of 20 to 45% by mass realizes favorable adhesion due to interaction between the chlorine atoms contained by the chlorinated polyolefin resin (b1) and the molecular end groups of the polyphenylene sulfide resin (a1), thereby making it possible form a strong coated film layer (2) without having to carry out surface roughening treatment.

Examples of the chlorinated polyolefin resin (b1) used here include low density chlorinated polyethylene resin, high density chlorinated polyethylene resin and chlorinated polypropylene resin, with chlorinated polypropylene resin being the most preferable.

Although the chlorine atom content of the chlorinated polyolefin resin (b1) is 20 to 45% by mass, it is preferably 20 to 35% by mass from the viewpoint of adhesion between the coated film layer (B) and the molded article (A). In addition, the chlorinated polyolefin resin (b1) preferably has a melt viscosity at 25° C. of 100 to 800 mPa·s, and particularly preferably 300 to 600 mPa·s, from the viewpoint of adhesion with the molded article (A). The use of this prescribed chlorinated polyolefin resin (b1) for the solid component of the coating makes it possible for the coated film layer (B) formed by applying the coating to demonstrate superior adhesion with the molded article (A) without having hardly any effect of the composition of the polyphenylene sulfide resin material (a).

In addition, the aforementioned coating comprises the chlorinated polyolefin resin (b1) having a chlorine atom content of 20 to 45% by mass and an organic solvent as essential components.

The organic solvent used here may be any one insofar as it is able to lower the viscosity of the chlorinated polyolefin resin (b1) to a suitable level. Examples thereof include aromatic hydrocarbon-based organic solvents such as toluene or xylene, alicyclic hydrocarbon-based organic solvents such as cyclohexane, ester-based organic solvents such as ethyl acetate, isopropyl acetate or isobutyl acetate, ketone-based organic solvents such as acetone and methyl ethyl ketone (MEK), and alcohol-based organic solvents such as isobutyl alcohol, cyclohexanol or methyl cyclohexanol. Among these, aromatic hydrocarbon-based organic solvents or alicyclic hydrocarbon-based organic solvents are preferable from the viewpoint of solution storage stability.

In addition, the content of the chlorinated polyolefin resin (b1) in the coating is preferably 5 to 15% by mass from the viewpoint of obtaining a coating having appropriate flow characteristics.

In addition, in the case of using the coating as a primer for secondary surface processing, a colored pigment such as titanium oxide or carbon black is preferably contained in the coating to facilitate confirmation that the coating has been applied and to stabilize the color tone of secondary processing. In addition, the coating preferably contains an extender pigment such as talc, silica, clay or mica from the viewpoint of improving the smoothness of the structure surface following secondary processing and stabilizing adhesion, and may also contain other known stabilizers and plasticizers.

There are no particular limitations on the method for forming the coated film layer (B) in the present invention. For example, after degreasing the surface of the molded article (A) with alcohol, the resin solution containing the resin material (b) is applied to she surface of the molded article (A) by spray coating and the like followed by drying and curing.

Although a structure comprised of the molded article (A) and the coated film layer (B) obtained in this manner can be used as a finished product by using the coated film layer (B) as a top coat layer, in the present invention, the use of the coated film layer (B) as a primer for secondary surface processing is particularly preferable from the viewpoint of being able to produce molded articles for the purposes of improving design and modifying the surface thereof. In addition, although the film thickness of the coated film layer (B) can be selected as necessary, in the case of using the coated film layer (B) as a surface layer, the film thickness thereof is preferably 10 to 20 μm from the viewpoint of adhesion, while in the case of using as a primer, the film thickness is preferably 5 to 20 μm from the viewpoint of a favorable coated appearance.

Specific examples of methods for secondary surface processing of a structure comprising the molded article (A) and the coated film layer (B) include top coating treatment by applying a coating, vapor deposition, sputtering, ion plating, metal spraying and adhesion. Vapor deposition and top coating treatment by applying a coating are particularly preferable in the present invention from the viewpoint of superior adhesion with the coated film layer (B). Accordingly, the structure of the present invention is preferably a structure having a primer in the form of the coated film layer (B) on the molded article (A) and having a coated film layer additionally formed on the coated film layer (B) or a structure having a primer in the form of the coated film layer (B) on the molded article (A) and having a thin film metal layer additionally formed on the coated film layer (B).

Here, the top coating used in the case of carrying out top coating treatment as the secondary surface processing may be anyone insofar as it has adequate adhesion to the coated film layer (B), and examples of coatings that can be used include acrylurethane-based coatings, acrylmelamine-based coatings and acrylsilicon-based coatings, with acrylurethane-based coatings being particularly preferable from the viewpoint of allowing the obtaining of favorable adhesion.

In addition, bake coating and electrostatic coating can be applied for the coating method of the present invention as well as typically applied brush coating, roller coating, pray coating and dip coating.

In the case of carrying out bake coating, coating is carried out at the respective recommended temperature of the coating used, and there are no particular limitations on the baking temperature insofar as it does not impair the characteristics of the polyphenylene sulfide resin (a1). Far example, when gas is generated from the polyphenylene sulfide resin (a1) in the case of high-temperature conditions of 200° C. or higher, the preferable baking temperature is specifically within the range of 70 to 160° C.

In addition, although there are no particular limitations on the baking time provided insofar as it does not impair the practicality as a coated molded article, baking is preferably carried out for 20 to 60 minutes.

The thickness of the coated film is preferably 10 to 20 μm and particularly preferably 15 to 20 μm. Moreover, in the case of a double-coated type, the total thickness of the coated film is preferably 15 to 50 μm and particularly preferably 25 to 40 μm. Although there are no particular limitations on the upper limit of the thickness of the coated film, if the thickness is 50 μm or more, problems may occur such as the coating accumulating at the edges of the molded article, thereby impairing the appearance of the surface thereof.

A structure obtained according to the present invention is a structure having superior surface appearance and secondary surface processability along with high specific strength, and can be preferably used as a material of structural parts including cases of portable electric and electronic devices as well as automotive exterior parts including various types of sensors by taking advantage of these properties.

EXAMPLES

The following provides a detailed explanation of the present invention through examples and comparative examples thereof. Furthermore, the evaluation methods used in the following examples and comparative examples are described below.

<Initial Adhesion Test>

Initial adhesion was evaluated using the cross-cut evaluation method after allowing the molded article to stand for 48 hours following coating or vapor deposition. Eleven lines were cut into the surface of the coated article in the horizontal and vertical directions at 1 mm intervals using a cutter knife. Then, Cellophane tape (registered trademark, Nichiban Co., Ltd., No. 405-IP) was affixed over the resulting 100 squares measuring 1 mm on side and completely adhered to the coated film. After affixing the tape, one end of the tape was grabbed with the fingers and peeled off in a single movement followed by counting the number of squares that remained or the molded article without being peeled off and evaluating adhesion of the coated film based on the criteria indicated below.

⊚ (Excellent): 100/100 squares (no. of remaining squares/100)
○ (Good): 99 to 50/100 squares
× (Poor): 49 to 0/100 squares <Humidity and Heat Resistance Test>

The molded article following coating or vapor deposition was allowed to stand for 120 hours in a constant temperature, constant humidity chamber set to a temperature of 60° C. and relative humidity of 95% followed by removing the molded article and allowing to stand for 24 hours at room temperature. The initial adhesion test was then carried out in the same manner as described above to evaluate adhesion of the coated film.

<Thermal Shock Cycle Resistance Test>

The molded article following coating or vapor deposition was placed in a thermal shock chamber set to the thermal shock cycle conditions indicated below and then allowed to stand a room temperature for 24 hours. Then, the initial adhesion test was carried out in the same manner as described above to evaluate adhesion of the coated film (Thermal shock cycle conditions: −20° C.×2 hr to 60° C., 95% RH×2 hr/cycler 3 cycles.) (95% RH refers to a relative humidity of 95%.)

Examples 1-S and Comparative Examples 1-3

Secondary Processing Method Top Coating with a Coating

After uniformly blending each of the materials shown in Table 1 at the mass ratios shown in the table, the mixtures were kneaded and extruded at 290 to 330° C. using a twin-screw extruding machine having a diameter of 35 mm to obtain PPS resin materials PPS1 to PPS4. Continuing, the PPS resin materials were used to mold rectangular sheets measuring 50×105×2 mm with an injection molding machine.

TABLE 1

| Mixing ratio for forming PPS resin materials (parts by mass) | | | | | |
|---|---|---|---|---|---|
| | PPS1 | PPS2 | PPS3 | PPS4 | PPS5 |
| PPS (1) | 50.0 | 49.5 | | | 50.0 |
| PPS (2) | 12.5 | 12.0 | | | 12.5 |
| PPS (3) | | | 57.5 | 57.5 | |
| GF | 35 | 35 | 42 | 42 | 35 |
| ELA | 2 | 2 | | | 2 |
| ADD1 | | 1 | | | |
| ADD2 | 0.5 | 0.5 | 0.5 | | |
| ADD3 | | | | 0.5 | 0.5 |

The abbreviations used in Table 1 indicate the following.
PPS(1): Linear polyphenylene sulfide resin (MFR as determined according to ASTM D1239-86: 1000 g/1 min)
PPS(2): Linear polyphenylene sulfide resin (MFR as determined according to ASTM D1238-S6: 10 g/10 min)
PPS(3): Linear polyphenylene sulfide resin (MFR as determined according to ASTM D1238-86: 600 g/10 min)
GF: Chipped glass fiber (Asahi Fiberglass Co., Ltd., FT562, fibrous inorganic filler)
ELA: Glycidyl methacrylate-modified ethylene-methyl acrylate copolymer (Sumitomo Chemical Co., Ltd., Bondfast 7L, elastomer)
ADD1: Polycarbodiimide (Nisshinbo Industries Inc., Carbodiimide HMV-8CA, resin)
ADD2: Montanic acid mixed ester wax (Clariant Japan K.K., Licolub WE40, ester-based wax)
ADD3: High density polyethylene wax (BASF Japan Ltd., AH6 polyethylene-based wax)

Next, after gently decreasing the surface of the rectangular sheets obtained in this manner with alcohol, each of the coatings shown in the following Table 2 (coatings B to G) were applied as primers to produce the polyphenylene sulfide resin coated articles of Examples 1 to 8 and Comparative Example 2.

Moreover, a top coating (Origin Electric Co., Ltd., MG Net T, acrylmelamine-based resin) was spray coated onto the structures using specifications consisting of a setting time of 5 minutes and applying two coats and baking once followed by baking for 30 minutes at 150° C. to form coated films.

The dry thickness of the primer layer was about 13 to 16 μm while that of the top coat layer was about 15 to 17 μm. The results of evaluating adhesion of the coated film using the aforementioned initial adhesion test, humidity and heat resistance test and thermal shock cycle resistance test are shown in Table 2.

Furthermore, when coating A was attempted to be prepared using chlorinated polypropylene having a chlorine atom content of less than 20% by mass for Comparative Example 1, the coating did not dissolve in the organic solvents (toluene, xylene, cyclohexane) thereby making it difficult to prepare the coating and preventing formation of the primer layer.

Comparative Example 3

No Primer

A rectangular sheet measuring 50×150×2 mm was molded with an injection molding machine using the PPS1 base layer material described above. After gently degreasing this rectangular sheet with alcohol, only a top coating (Origin Electric Co., Ltd., Planet PX-1, two-component curing type acrylurethane resin) was spray coated using specifications consisting of a setting time of 5 minutes and applying two coats and baking once without carrying primer treatment. Then, the sheet was baked for 30 minutes at 80° C. to form a coated film. The dry thickness of the coated film was about 20 to 23 μm. The results of evaluating adhesion of the coated film using the aforementioned initial adhesion test, humidity and heat resistance test and thermal shock cycle resistance test are shown in Table 2.

TABLE 2

| | Comp. Ex. 1 | Ex. 1 | Ex. 2 | Ex. 3 | Ex. 4 | Ex. 5 | Ex. 6 | Ex. 7 | Ex. 8 | Comp. Ex. 2 | Comp. Ex. 3 |
|---|---|---|---|---|---|---|---|---|---|---|---|
| Base layer material | PPS1 | PPS1 | PPS1 | PPS2 | PPS3 | PPS4 | PPS1 | PPS1 | PPS1 | PPS1 | PPS1 |
| Primer layer (chlorine atom content) | Coating A (less than 20) | Coating B (22) | Coating C (24.5) | Coating C (24.5) | Coating C (24.5) | Coating C (24.5) | Coating D (29.5) | Coating E (35) | Coating F (41) | Coating G (66) | None |

TABLE 2-continued

|  | Comp. Ex. 1 | Ex. 1 | Ex. 2 | Ex. 3 | Ex. 4 | Ex. 5 | Ex. 6 | Ex. 7 | Ex. 8 | Comp. Ex. 2 | Comp. Ex. 3 |
|---|---|---|---|---|---|---|---|---|---|---|---|
| Top coat material | — | Acryl-melamine coating | Acryl-melamine coating | Ancyl-melamine coating | Acryl-melamine coating | Acryl-melamine coating | Acryl-melamine coating | Acryl-melamine coating | Acryl-melamine coating | Acryl-melamine coating | Acryl-melamine coating |
| Initial evaluation (adhesion) | — | ◎ | ◎ | ◎ | ◎ | ◎ | ◎ | ◎ | ○ | X | X |
| Humidity and heat resistance | — | ○ | ○ | ○ | ○ | ○ | ○ | ○ | ○ | X | X |
| Thermal shock cycle resistance | — | ○ | ○ | ○ | ○ | ○ | ○ | ○ | ○ | X | X |

Coatings B to G used for the primer in each of the examples and comparative examples above were as indicated below.

Coating B:
Origin Electric Co., Ltd., "Planet PP Primer Gray K-5", single-component type polyolefin-based coating, chlorine atom content: 22% by mass, organic solvents: toluene, xylene and cyclohexane, non-volatile component: 22.3% by mass Coating C:
Origin Electric Co., Ltd., "Planet PP Primer Gray K-3", single-component type propylene-based coating, chlorine atom content: 24.5% by mass; organic solvents: toluene, xylene and cyclohexane, non-volatile component: 23.8% by mass Coating D: Single-component type polyolefin-based coating, chlorine atom content: 29.5% by mass, organic solvents: toluene, xylene and cyclohexane, non-volatile component: 23.8% by mass Coating E:
Single-component type polyolefin-based coating, chlorine atom content: 35% by mass, organic solvents: toluene, xylene and cyclohexane, non-volatile component: 23.8% by mass Coating F:
Single-component type polyolefin-based coating, chlorine atom content: 41% by mass, organic solvents: toluene, xylene and cyclohexane, non-volatile component: 23.8% by mass Coating G:
Single-component type polyolefin-based coating, chlorine atom content: 66% by mass, organic solvents: toluene, xylene and cyclohexane, non-volatile component: 23.8% by mass Examples 9-12 and Comparative Examples 4 and 5

Secondary Processing Method Aluminum Vapor Deposition

Molded articles were obtained using the molded articles of PPS1 to PPS4 in the same manner as aforementioned Examples 1 to 9 followed by treating with primer using the sane method as in aforementioned Examples 1 to 4. Next, the primer-treated articles were attached to a supporting jig and inserted into a vacuum vessel followed by carrying out vapor deposition of aluminum metal by depositing at a prescribed pressure by evacuating the air in the vessel to vacuum. At this time, the supporting jig was spun or rotated as necessary. The thickness of the metal film was 0.05 to 0.1 µm. The aforementioned tests were then carried out to evaluate adhesion of the deposited film. The results of evaluating the deposited film on the basis of initial adhesion, humidity and heat resistance test and thermal shock cycle resistance test as previously described are shown in Table 3.

Comparative Examples 4 and 5

Secondary Processing Method: Aluminum Vapor Deposition

After gently degreasing the molded articles of the aforementioned PPS1 with isopropyl alcohol, vapor deposition was carried out in the same manner as Examples 9 to 12 without carrying out primer treatment followed by performing the aforementioned tests. The results of evaluating the deposited film on the basis of initial adhesion, humidity and heat resistance test and thermal shock cycle resistance test as previously described are shown in Table 3.

TABLE 3

|  | Ex. 9 | Ex. 10 | Ex. 11 | Ex. 12 | Comp. Ex. 4 | Comp. Ex. 5 |
|---|---|---|---|---|---|---|
| Base layer material | PPS1 | PPS2 | PPS3 | PPS4 | PPS4 | PPS1 |
| Primer layer | Coating C (24.5) | Coating C (24.5) | Coating C (24.5) | Coating C (24.5) | None | None |
| Deposited layer | Aluminum deposited film | Aluminum deposited film | Aluminum deposited film | Aluminum deposited film | Aluminum deposited film | Aluminum deposited film |
| Initial evaluation | ○ | ○ | ○ | ○ | X | X |
| Humidity and heat resistance | ○ | ○ | ○ | ○ | X | X |

TABLE 3-continued

| | Ex. 9 | Ex. 10 | Ex. 11 | Ex. 12 | Comp. Ex. 4 | Comp. Ex. 5 |
|---|---|---|---|---|---|---|
| Thermal shock cycle resistance | ○ | ○ | ○ | ○ | X | X |

Structures of the present invention in the form of the molded articles of examples 1 to 9 and the aluminum deposited articles of Examples 9 to 11 all were confirmed to demonstrate superior coating adhesion of the top coating or deposited film. In the case of coating articles molded from PPS resin materials with a coated film containing a chlorinated polyolefin resin (b1) shown in Table 2, extremely favorable coated film adhesion and deposited film adhesion were confirmed to be obtained without having an effect on the composition of the base layer material.

A structure of the present invention allows the application of various top coating and secondary processing as a result of coating resin material (b) containing chlorinated polyolefin resin (b1). The top coatings used in the Examples described above are coatings which are widely used for coating magnesium alloys which have been used in mobile devices such as cellular telephones and notebook PCs. Therefore, excellent effects of the present invention suggests possibilities that molded articles containing polyphenylene sulfide resin is used as a material which is used instead of magnesium alloy used for the cases of such devices.

INDUSTRIAL APPLICABILITY

The polyphenylene sulfide resin material structure of the present invention is able to facilitate various types of secondary processing such as coating and vapor deposition on the surface thereof while also having high specific strength. Therefore, the structure can be used as various types of materials and/or parts such as those for portable electronic devices or automotive exterior parts. In addition, it can also be used as an alternative part material used in place of metal materials such as magnesium alloy, thus enabling it to be useful in a wide range of industrial fields.

The invention claimed is:

1. A polyphenylene sulfide resin coated article comprising:
a molded article (A) of a polyphenylene sulfide resin material (a) which comprises a polyphenylene sulfide resin (a1), and
a primer layer (B) formed by applying a coating on the surface of the molded article (A), wherein the coating is an organic solvent coating, which comprises a resin component consisting of a chlorinated polyolefin resin (b1) at a ratio of 5 to 15% by mass, and the chlorinated polyolefin resin (b1) has a chlorine atom content of 20 to 45% by mass and is selected from a group consisting of low density chlorinated polyethylene resin, high density chlorinated polyethylene resin and chlorinated polypropylene resin.

2. The polyphenylene sulfide resin coated article according to claim 1 wherein the melt viscosity of the chlorinated polyolefin resin (b1) at 25° C. is 100 to 800 mPa·s.

3. The polyphenylene sulfide resin coated article according to claim 1 wherein the film thickness of the coated film layer (B) formed on the molded article (A) is 5 to 20 μm.

4. The polyphenylene sulfide resin coated article according to claim 1, wherein the polyphenylene sulfide resin material (a) further comprises a fibrous inorganic filler (a2) in addition to the polyphenylene sulfide resin (a1).

5. The polyphenylene sulfide resin coated article according to claim 1, wherein the polyphenylene sulfide resin material (a) further comprises a non-fibrous inorganic filler (a3) in addition to the polyphenylene sulfide resin (a1).

6. The polyphenylene sulfide resin coated article according to claim 1, wherein the polyphenylene sulfide resin material (a) further comprises an elastomer component (a4) in addition to the polyphenylene sulfide resin (a1).

7. The polyphenylene sulfide resin coated article according to claim 1, wherein the polyphenylene sulfide resin material (a) further comprises an ester-based wax (a4) in addition to the polyphenylene sulfide resin (a1).

8. The polyphenylene sulfide resin coated article according to claim 1, wherein another coated film layer is formed on the coated film layer (B) used as a primer.

9. The polyphenylene sulfide resin coated article according to claim 1, wherein a thin film metal layer is formed on the coated film layer (B) used as a primer.

10. The polyphenylene sulfide resin coated article according to claim 1, wherein the chlorinated polyolefin resin (b1) having a chlorine atom content of 20 to 45% by mass is a chlorinated polypropylene resin having a chlorine atom content of 20 to 45% by mass.

11. The polyphenylene sulfide resin coated article according to claim 1 wherein the melt viscosity of the chlorinated polyolefin resin (b1) at 25° C. is 100 to 800 mPa·s.

12. The polyphenylene sulfide resin in coated article according to claim 1 wherein the film thickness of the coated film layer (B) formed on the molded article (A) is 5 to 20 μm.

13. The polyphenylene sulfide resin coated artical according to claim 1, wherein the coated film layer (B) formed by applying a coating on the surface of the molded article (A) is formed by applying a coating on the surface of the molded article (A) and drying the coating.

14. The polyphenylene sulfide resin coated article according to claim 1, wherein the organic solvent coating comprises an organic solvent selected from the group consisting of: toluene, xylene, cyclohexane, ethyl acetate, isopropyl acetate, isobutyl acetate, acetone, methyl ethyl ketone, isobutyl alcohol, cyclohexanol, and methyl cyclohexanol.

* * * * *